No. 12,837. REISSUED AUG. 4, 1908.

L. FAUST & W. A. BROLIN.

FURNITURE.

APPLICATION FILED MAR. 23, 1908.

2 SHEETS—SHEET 1.

Witnesses:
Ira D. Perry
Robert H. Weir

Inventors:
Levin Faust
Willard A. Brolin
By Luther L. Miller
Atty.

No. 12,837. REISSUED AUG. 4, 1908.

L. FAUST & W. A. BROLIN.

FURNITURE.

APPLICATION FILED MAR. 23, 1908.

2 SHEETS—SHEET 2

Witnesses:

Ira D. Perry

Robert A. Weir

Inventors:

Levin Faust

Willard A. Brolin

By Luther L. Miller

Atty.

UNITED STATES PATENT OFFICE.

LEVIN FAUST AND WILLARD A. BROLIN, OF ROCKFORD, ILLINOIS.

FURNITURE.

No. 12,837. Specification of Reissued Letters Patent. Reissued Aug. 4, 1908.

Original No. 837,293, dated December 4, 1906, Serial No. 312,776. Application for reissue filed March 23, 1908. Serial No. 422,864.

*To all whom it may concern:*

Be it known that we, LEVIN FAUST and WILLARD A. BROLIN, citizens of the United States of America, residing at Rockford, in the county of Winnebago and State of Illinois, have invented certain new and useful Improvements in Furniture, of which the following is a specification.

Our invention relates specifically to mechanism for equalizing the travel of the opposite ends of bookcase doors or closures and bureau and other sliding drawers and similar slidable parts of furniture.

Figure 1:
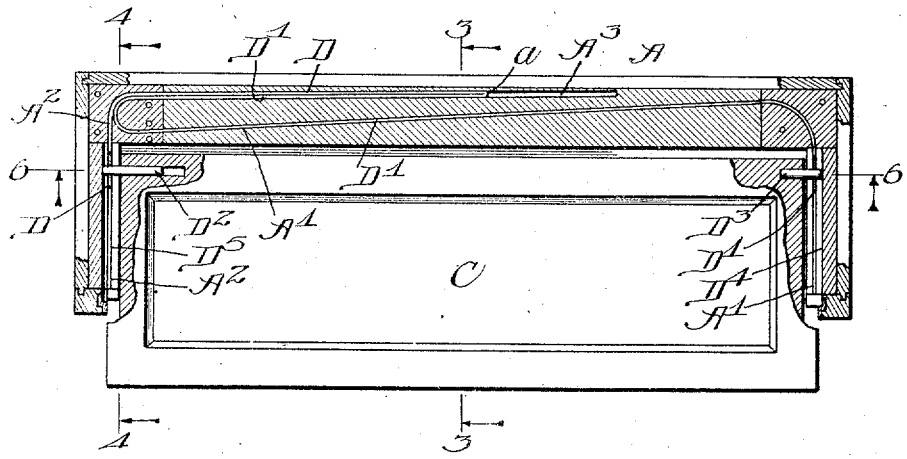
Figure 2:
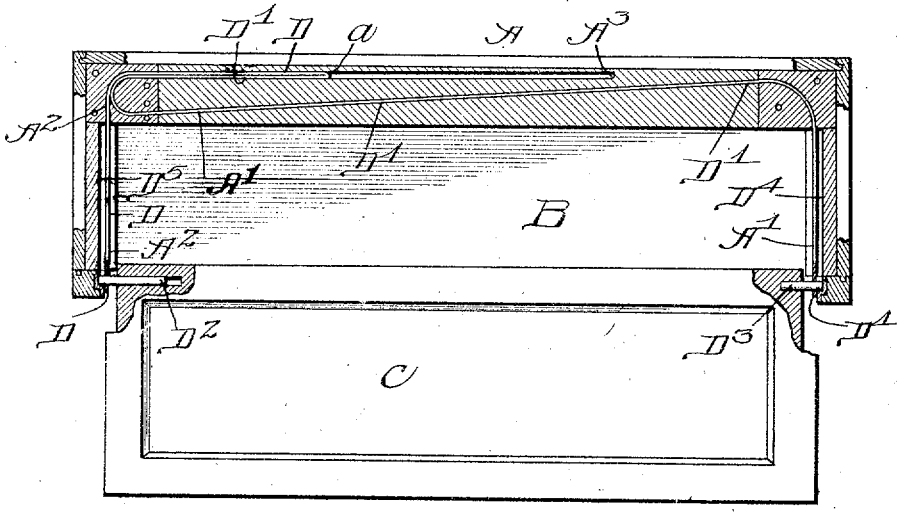
Figure 3:
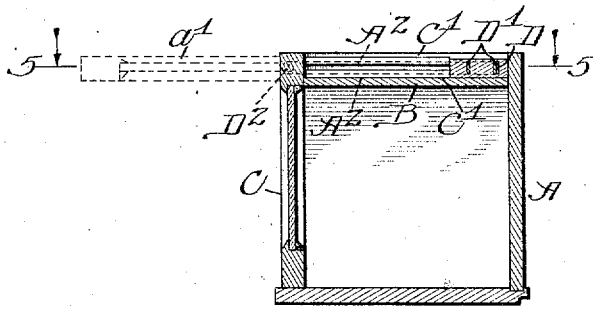
Figure 4:
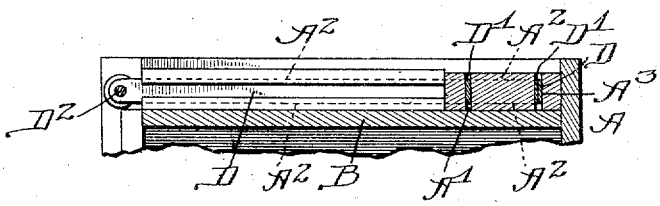
Figure 5:
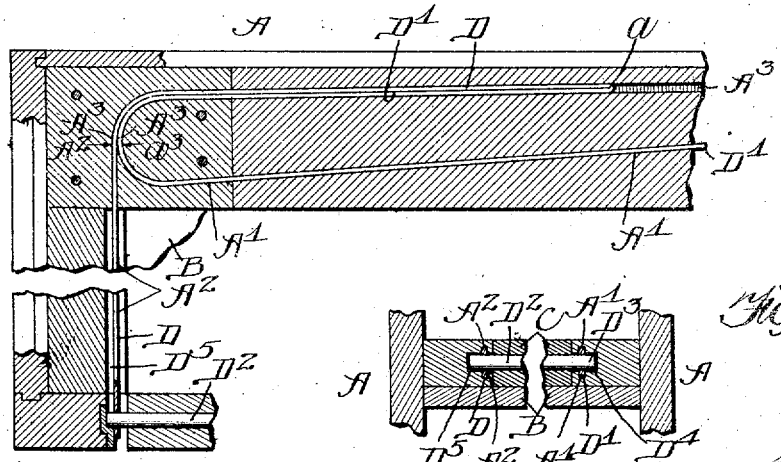
Figure 6:
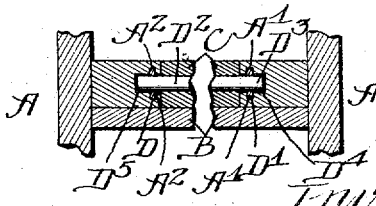

Referring to the accompanying drawings, which form a part of this specification, Figure 1 is a top plan view of a bookcase provided with our improvement having parts thereof horizontally sectioned away to show the interior construction, arrangement, and operation of the movable parts of the same. Fig. 2 is a like view of the same with parts thereof in different positions from those shown in Fig. 1, which last-mentioned figure shows the closure of the bookcase wide open and slid inward to its backward limit of travel, while Fig. 2 shows the closure slid outward to its forward limit of travel ready to be swung vertically downward to a closed position. Fig. 3 is a transverse section at the dotted line 3 3 in Fig. 1 of the bookcase closed. Fig. 4 is a section at the dotted line 4 4 in Fig. 1 of the upper portion of a complete case minus its closure. Fig. 5 is an enlarged sectional detail through the dotted line 5 5 in Fig. 3 of the left-hand half of the case. Fig. 6 is a section at the dotted line 6 in Fig. 1 of parts there shown.

Like letters of reference indicate corresponding parts throughout the several views.

That embodiment of the invention which is herein illustrated comprises a rectangular section A of a sectional bookcase of the usual or any desired construction having two single guideways $A'$ $A^2$ therein extending transversely thereof and substantially parallel to each other from the front to the rear portion of the same, the guideway $A'$ curving thence inward and extending along lengthwise of the case-section and thence backward to $a^3$, Fig. 5, into confluence with the guideway $A^2$, the confluent guideways $A^3$ curving thence backward and inward and extending along lengthwise of the case-section.

B is a partition arranged below and parallel to the top of the case-section A a sufficient distance therefrom to form a recess therein for the admission of the closure thereof when it is swung to a horizontal position, as indicated in Fig. 3, preparatory to being slid into the case-section.

C is a closure for the opening in the front of the case-section A and is horizontally slidable in the recess $C'$, Fig. 3, in the top of the same.

D $D'$ are metallic tapes (formed, preferably, of thin strips of flexible steel) pivotally connected, by means of pintles $D^2$ $D^3$, with the end portions of the closure C and extending therefrom lengthwise through the single guideways $A'$ $A^2$ and thence into the confluent guideways $A^3$ where they are joined together by their inner ends at $a$, Fig. 5, such pintles $D^2$ $D^3$ projecting into the grooves $D^4$ $D^5$ in the case-section A and serving as slidable bearings for the closure C.

If the closure C be swung from its vertical position, Fig. 3, to a horizontal position) indicated by the dotted lines $a'$) and be slid thence backward to its inner limit of travel, as in Fig. 1, the tapes D $D'$ will have traveled inward with the closure a corresponding distance, their united ends $a$ meanwhile having slid toward the right hand—from the position they occupy in Fig. 2 to the position they are shown as occupying in Fig. 1—also a corresponding distance in the open end of the confluent guideways $A^3$, Fig. 2. The tapes D $D'$ being formed of inelastic and longitudinally-unyielding material will obviously serve positively and accurately to equalize the slidable travel of a bookcase closure, a bureau or other drawer, or any similar sliding part in furniture or elsewhere.

Having fully described our invention, what we claim as new, and desire to secure by Letters Patent, is—

1. In combination, a case-section or analogous structure having two guideways therein extending transversely thereof and substantially parallel to each other, from the front to the rear portion of the same, one of said guideways curving thence inward and extending along lengthwise of the section, and thence backward into confluence with the remaining guideway, the confluent guideways curving thence backward and inward and extending along lengthwise of the section, a closure for the opening in the structure and metallic tapes connecting with the end portions of said closure and extending therefrom lengthwise through the two guideways and into the confluent guideways, said tapes being united at their rear end portions, substantially as described and for the purpose specified.

2. In combination, a case section or analogous structure having two guideways $A'$ $A^2$ therein extending transversely thereof and substantially parallel to each other, from the front to the rear portion of the same, one of said guideways $A'$ curving thence inward and extending along lengthwise of the section and thence backward into confluence with the remaining guideway $A^2$, the confluent guideways $A^3$ curving thence backward and inward and extending along lengthwise of the section, a closure C for the opening in the structure, and metallic tapes D D′ connecting with the end portions of said closure and extending therefrom lengthwise through the guideways $A'$ $A^2$ and into the confluent guideways $A^3$, said tapes being united at their rear end portions, substantially as described and for the purpose specified.

3. An article of furniture having a part mounted to move therein, and two guideways at opposite sides of said article of furniture, portions of said guideways extending in the direction of movement of said movable part and other portions of said guideways merging into one guideway; and two metallic tapes mounted in said guideways and connected to said movable part and to each other for equalizing the movements of said movable part.

4. An article of furniture having a guideway therein; inelastic flexible members having a portion of their length located in said guideway and connected to each other at adjacent ends, two of the ends of said tapes being separated; guide means for the separated ends; and a movable part connected to the latter ends.

5. An article of furniture having two guideways therein extending transversely thereof and substantially parallel to each other, from the front to the rear portion of the same, one of said guideways curving thence inward and extending along lengthwise of the section into confluence with the other guideway, the confluent guideways extending along lengthwise of the section; a movable part; and flexible members connected with said part and lying in said guideways, said flexible members being united at their rear ends.

6. The combination, with a receptacle having an opening and provided with a receiving guideway, of a closure member, and tapes connected at one end to said door, the other ends of said tapes lying side by side in said guideway; and means for guiding the portions of said tapes which are outside of said guideway.

7. A bookcase section having a recess therein; a door, tapes attached at one end to each end of said door, the other ends of said tapes lying side by side in said recess, and guide means for said tapes forward of said recess.

8. The combination, with a receptacle having an opening and provided with a guideway; inelastic tapes having a portion of their length incased in said guideway and in contact with each other, the other ends of said tapes being separated; and a closure member secured to the latter ends.

9. A bookcase section having a receiving recess; tapes in said recess and projecting beyond the same; a closure member for said bookcase section; and means for securing the projecting ends of the tapes to said closure member, said closure member being movable to cause a movement of one of the tapes within the recess coextensive with the movement of an adjacent tape.

In testimony whereof we have signed our names to this specification in the presence of two subscribing witnesses.

LEVIN FAUST.
W. A. BROLIN.

Witnesses:
G. E. JOHNSON,
HANNAH E. SWEMBERG.